United States Patent [19]

Asano et al.

[11] Patent Number: 4,817,751
[45] Date of Patent: Apr. 4, 1989

[54] A DRIVING FORCE DISTRIBUTION TRANSMISSION FOR VEHICLES WITH FOUR-WHEEL DRIVE

[75] Inventors: Hiroaki Asano, Okazaki; Keiichi Nakamura, Kariya; Masaji Yamamoto; Shigeo Tanooka, both of Okazaki; Toshifumi Sakai, Aichi, all of Japan

[73] Assignee: Toyoda Koki Kabushiki Kaisha, Kariya, Japan

[21] Appl. No.: 162,124

[22] Filed: Feb. 29, 1988

[30] Foreign Application Priority Data

Mar. 27, 1987 [JP] Japan ................................ 62-75241

[51] Int. Cl.⁴ ............................................. B60K 17/34
[52] U.S. Cl. .................................... 180/233; 137/102; 192/103 F
[58] Field of Search ............... 180/233, 197, 247, 248, 180/249; 192/103 F, 85 AA, 85 R, 57; 137/102

[56] References Cited

U.S. PATENT DOCUMENTS

| 4,466,502 | 8/1984 | Sakai ........................ 180/247 |
| 4,709,775 | 12/1987 | Watanabe ................. 180/233 |
| 4,719,998 | 1/1988 | Hiramatsu ................. 180/233 |
| 4,762,213 | 8/1988 | Watanabe ................. 180/233 |

FOREIGN PATENT DOCUMENTS

| 133921 | 8/1983 | Japan ........................ 180/233 |
| 157436 | 7/1986 | Japan ........................ 180/233 |
| 263838 | 11/1986 | Japan ........................ 180/233 |
| 249828 | 11/1986 | Japan ........................ 180/233 |
| 50228 | 3/1987 | Japan ........................ 180/233 |

Primary Examiner—David M. Mitchell
Assistant Examiner—Everett G. Diederiks, Jr.
Attorney, Agent, or Firm—Oblon, Fisher, Spivak, McClelland & Maier

[57] ABSTRACT

A driving force distribution transmission for use with a vehicle with fourwheel drive. The vehicle has first and second drive shafts which are connected with the front and rear wheels, respectively. The transmission has a hydraulic clutch, a differential pump, a bias spring, and a selector valve. The clutch has outer and inner plates which are caused to frictionally engage with each other to transmit rotary power between the two drive shafts. The pump produces a hydraulic pressure corresponding to the difference between the rotating speeds of the drive shafts. The oil delivered by the pump is forced into a reservoir through a first passage in which a restrictor is formed. A second passage connects the pump with an oil chamber in the clutch. A third passage connects the oil chamber with the reservoir without via the restrictor. The spring always presses the outer and inner plates towards each other. When the difference between the speeds of the drive shafts is small, the selector valve closes the second passage and opens the third passage. When the difference is large, the valve opens the second passage and closes the third passage.

5 Claims, 3 Drawing Sheets

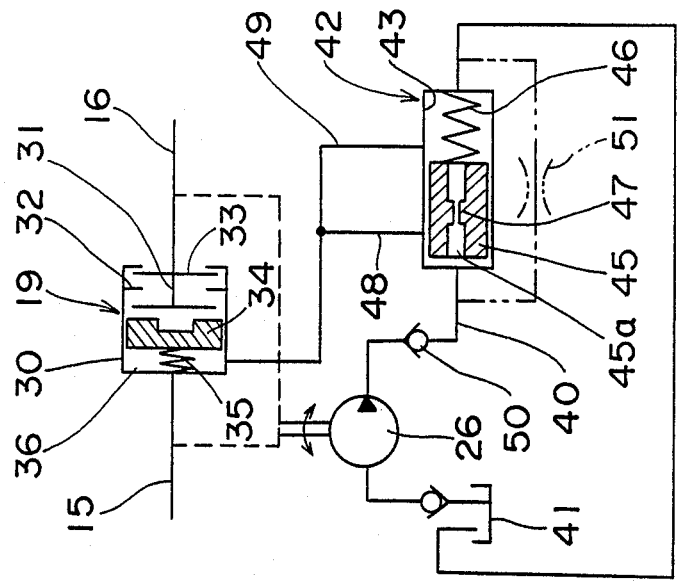
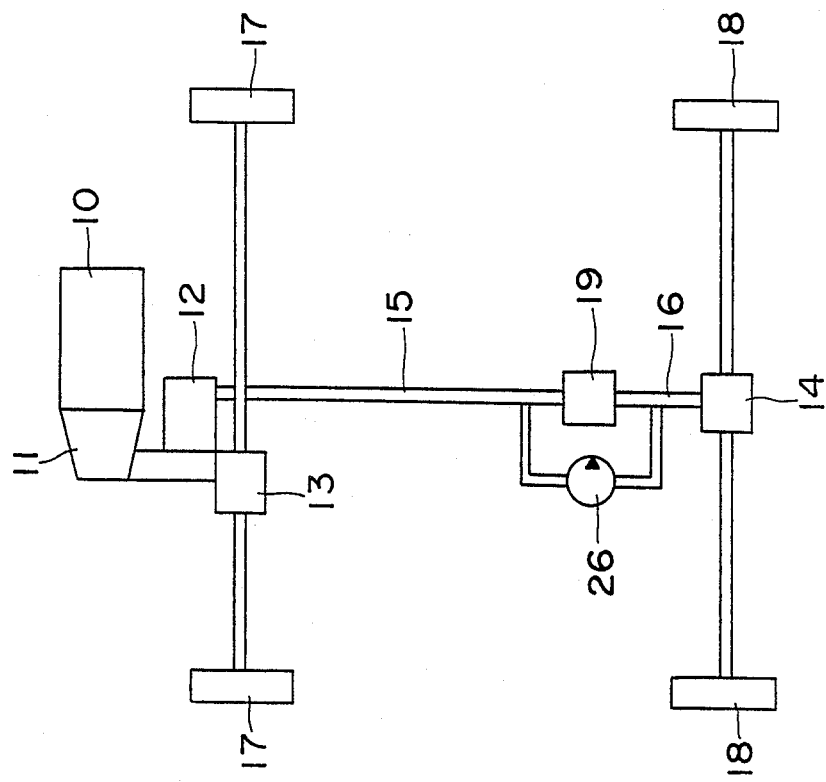

A DRIVING FORCE DISTRIBUTION TRANSMISSION FOR VEHICLES WITH FOUR-WHEEL DRIVE

BACKGROUND OF THE INVENTION

1. Field of the Invention

The present invention relates to a driving force distribution transmission for use with a vehicle with four-wheel drive and, more particularly, to a transmission which uses a hydraulic clutch to transmit rotary power from one drive shaft to the other drive shaft.

2. Description of the Prior Art

A conventional transmission of this kind is shown in FIG. 1, where a hydraulic clutch 3 is disposed between drive shafts 1 and 2 which are connected with the front wheels and the rear wheels, respectively, of a vehicle. A differential pump 4 produces a hydraulic pressure corresponding to the difference between the rotational speeds of the shafts 1 and 2. The oil delivered by the pump 4 is drained off to a tank 6 via a restrictor 5. The hydraulic pressure obtained ahead the restrictor 5 is caused to act on a piston 8 mounted in an oil chamber 7 formed in the clutch 3, pressing an inner plate 9b against an outer plate 9a inside the clutch 3. Thus, rotary power is transmitted from one of the two drive shafts to the other.

In this transmission, the transmitted torque T increases in proportion to the difference N between the rotational speeds of the two drive shafts, as indicated by the broken line A in FIG. 2. During turns, the front and rear wheels move along arcs having different radii and so the wheels are braked by the road surface. This phenomenon, hereinafter referred to as "braking", occurs in the region M in FIG. 2. In order to prevent the torque transfer characteristic curve A from passing through the region M, the torque T is made to increase at a low rate in proportion to the difference N. Accordingly, when the difference N slightly goes beyond the region M, the torque T is not large enough to permit the four-wheeled drive to operate. As a result, when the vehicle travels over road surfaces of small frictional coefficients, the driver cannot feel comfortable.

SUMMARY OF THE INVENTION

Accordingly, it is a main object of the invention to provide a transmission which can maintain the transmitted torque small enough to permit the two drive shafts of a vehicle to rotate relative to each other within the aforementioned region where braking occurs, and which offers large transmitted torques when the braking region is slightly exceeded.

It is another object of the invention to provide a transmission which has the features as described in the preceding paragraph and which can maintain the transmitted torque at a substantially constant small value in spite of increases in the difference between the rotational speeds of the two drive shafts within the braking region, the transmission being further characterized in that it can suddenly increase the transmitted torque by a given value just when the braking region is exceeded.

It is a further object of the invention to provide a transmission which has the features described already and which is simple in structure, operates certainly, and maintains the transmitted torque at a substantially constant value within the braking region.

In brief, an inventive transmission for use with a vehicle with four-wheeled drive comprises a pump which produces a hydraulic pressure corresponding to the difference between the rotational speeds of the first and the second drive shafts of the vehicle. This pressure is returned to a reservoir through a first oil passage having a restrictor. A hydraulic clutch is mounted between the two drive shafts to transmit torque. A bias spring for augmenting the torque is mounted in the clutch. The oil delivered by the pump flows through a second oil passage and enters an oil chamber formed in the clutch. This oil chamber is directly connected with the reservoir by a third oil passage without via the restrictor. A selector valve is mounted to selectively open the second and third oil passages. When the difference between the rotational speeds of the two drive shafts is small, the selector valve opens only the third oil passage. Under this condition, only the force of the bias spring acts on the clutch to actuate it in such a way that the transmitted torque is kept at a substantially constant small value within the braking region. When the difference between the rotational speeds is large, the selector valve opens only the second oil passage. Under this condition, hydraulic pressure acts on the clutch together with the force of the spring. The result is that a larger torque can be transferred between the drive shafts when the braking region is slightly exceeded.

Other objects and features of the invention will appear in the course of the description thereof which follows.

BRIEF DESCRIPTION OF THE DRAWINGS

FIG. 3 is a schematic diagram of the drive system of a vehicle with four-wheeled drive, the vehicle being equipped with a transmission according to the invention;

FIG. 4 is a hydraulic circuit diagram of a first specific example of transmission according to the invention;

DETAILED DESCRIPTION OF THE PREFERRED EMBODIMENTS

Figure 2:
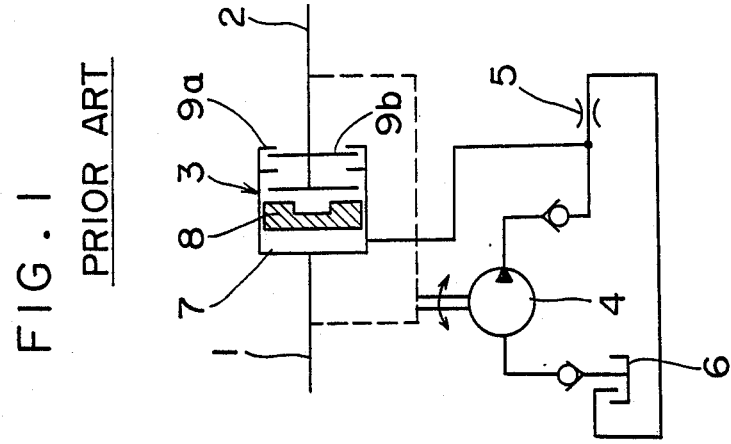
FIG. 2 is a graph in which transmitted torque is plotted against the difference between the rotational speeds of two drive shafts.
Figure 1:
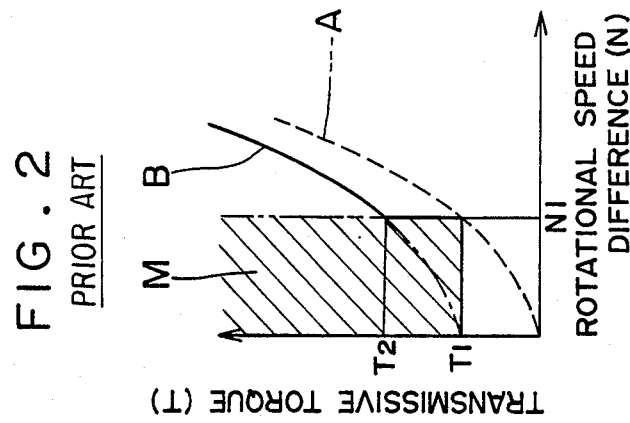
FIG. 1 is a hydraulic circuit diagram of a conventional transmission.

Referring to FIG. 3, a vehicle with four-wheeled drive is schematically shown. This vehicle has an engine 10, a transmission 11, a transfer case 12, a front differential 13, a rear differential 14, a front drive shaft 15 (hereinafter referred to as "the input shaft"), a rear drive shaft 16 (hereinafter referred to as "the output shaft"), front wheels 17, rear wheels 18, a hydraulic clutch 19 mounted between the input shaft 15 and the output shaft 16, and a differential pump 26 for drawing oil at a flow rate corresponding to the difference between the rotational speeds of the shafts 15 and 16. The clutch 19 transmits rotary power from the input shaft 15 to the output shaft 16, or vice versa.

Referring to FIG. 4, the hydraulic clutch 19 comprises a housing 30, a rotating shaft 31, a plurality of outer plates 32 which rotate together with the housing 30, a plurality of inner plates 33 each disposed between the outer plates 32, a piston 34 disposed so as to be slidable inside the housing 30, and a compressed spring 35 for biasing the piston 34 toward the direction to press the inner plates 33 against the outer plates 32. The spring 35 serves to give a torque at all times. The inner plates 33 rotate together with are the rotating shaft 31. An oil chamber 36 into which hydraulic pressure is guided is formed between the housing 30 and the piston 34.

The specific structures of the differential pump 26 and the hydraulic clutch 19, the connection of the pump 26 with the input shaft 15 and the output shaft 16, and the connection of the clutch 19 with the shafts 15 and 16 are described in detail in U.S. patent application Ser. No. 058,868, filed on June 5, 1987 assigned to the same assignee as the present application. Therefore, the disclosure of the U.S. patent application regarding these points is incorporated in the present application.

A first oil passage 40 connects the exit of the differential pump 20 with an oil reservoir or tank 41. A pressure selector valve 42 for switching the pressure applied to the clutch between plural values is mounted in the passage 40. The valve 42 comprises a spool 45 capable of sliding in a hole 43 and a coiled spring 46 for urging the spool 45 toward the pump 20. The spool 45 is centrally provided with a hole 45a extending axially through it. A restrictor 47 is formed in the hole 45a.

A second oil passage 48 is connected to the hole 43 at a location on the side of the pump 26. A third oil passage 49 is connected to the hole 43. The other ends of the second and third passages, 48 and 49, are connected with the oil chamber 36 in the clutch 19. A check valve 50 is disposed in the first passage 40.

In the operation of the transmission constructed as described above, rotary power produced by the engine 10 is transmitted to the front differential 13 via the transmission 11 and also to the input shaft 15 via the transmission 11 and the transfer case 12. The power transferred to the input shaft 15 is then transmitted to the rear differential 14 via the hydraulic clutch 19 and the output shaft 16. When the rotational speeds of the shafts 15 and 16 become different, the differential pump 26 draws oil at a flow rate corresponding to the difference between the rotational speeds, and sends the oil to the hole 43 in the selector valve 42.

When the flow rate of oil drawn by the pump 20 is low, the pressure appearing ahead the restrictor 47 is low. In this state, the spool 45 assumes the left position in FIG. 4. The second oil passage 48 is closed by the spool 45, while the third passage 49 is open. Thus, the oil chamber 36 in the clutch 19 is connected with the tank 41 directly, i.e., without via the restrictor 47. The outer plates 32 and inner plates 33 of the clutch 19 are pressed against each other only by the biasing force of the spring 35 that produces bias torque. The transmitted torque T is a substantially constant small torque $T_1$ indicated by the solid line B in FIG. 2. If the vehicle goes along a tight corner, the input shaft 15 and the output shaft 16 are allowed to rotate relative to each other. Consequently, the aforementioned braking is prevented.

As the flow rate of oil drawn by the pump 20 increases, the pressure developed ahead the restrictor 47 increases, moving the spool 45 to the right against the action of the spring 46. As the spool 45 shifts to the right, the area of the opening through which the third oil passage 49 is in communication with the hole 43 decreases as indicated by the solid line C in FIG. 5. On the other hand, the area of the opening through which the second oil passage 48 is in communication with the hole 43 increases as indicated by the broken line D.

When the difference N between the rotational speeds of the shafts reaches $N_1$, say 30 rpm, at which the braking region M is just exceeded, the third passage 49 is closed by the spool 45, and only the second passage 48 is open. Under this condition, the pressure appearing ahead the restrictor 47 is guided into the oil chamber 36 in the clutch 19 through the second passage 48. This hydraulic pressure adds to the biasing force of the spring 35 which causes the piston 34 to press the outer plates 32 and the inner plate 33 against each other. At this time, the transmitted torque T increases to torque $T_2$ that is located almost vertical to torque $T_1$ in FIG. 2. Consequently, the vehicle with four-wheeled drive is able to travel over even road surfaces having small frictional coefficients stably without slippage.

Figure 5:
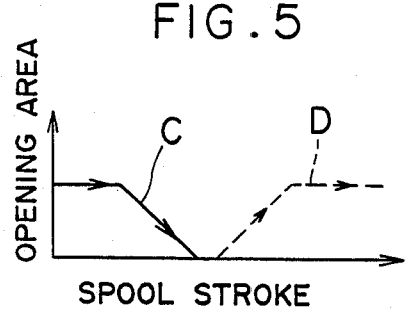
FIG. 5 is a graph showing the relation of the opening area of two oil passages to the stroke traveled by a spool.
Figure 6:
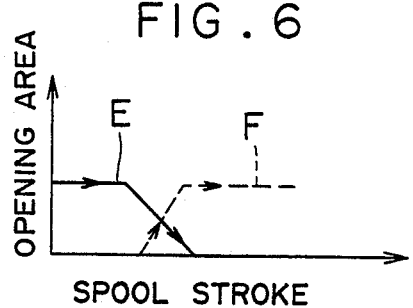
FIG. 6 is a graph similar to FIG. 5, but illustrating a modification of the aforementioned first example.
Figure 7:
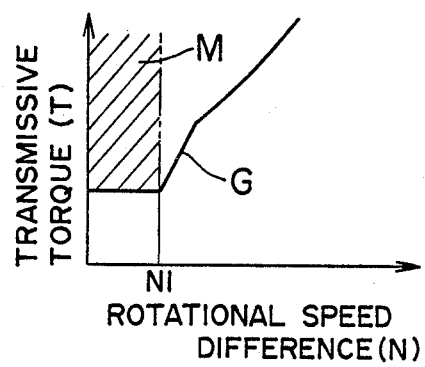
FIG. 7 is a graph which also illustrates said modification, and in which transmitted torque is plotted against the difference between the rotational speeds of the two drive shafts.

In the above example, the second passage 48 is opened after the third passage 49 is closed, as can be seen from FIG. 5. In a modified example, while the area of the opening through which the third passage 49 is in communication with the hole 43 is decreasing as indicated by the solid line E in FIG. 6, the area of the opening through which the second passage 48 is in communication with the hole 43 increases as indicated by the broken line F. At this time, the transmitted torque T exhibits a characteristic as indicated by the solid line G in FIG. 7. The torque increases moderately immediately after the braking region is exceeded.

In the example described first, the torque is increased by the spring 35 which produces the bias torque when the difference N is in excess of $N_1$, i.e., no braking occurs. It is also possible to reduce the diameter of the hole in the restrictor 47 so that the torque T may increase at a higher rate with increasing the difference N.

As a further modification of the example described first, a restrictor 51 is disposed instead of the restrictor 47 in the spool 45 and in a parallel relation to the selector valve 42, as indicated by the phantom lines in FIG. 4.

In the example described first, the hole 45a and the restrictor 47 are formed in the spool 45. The holes 43 and 45a form a part of the first oil passage 40.

Figure 8:
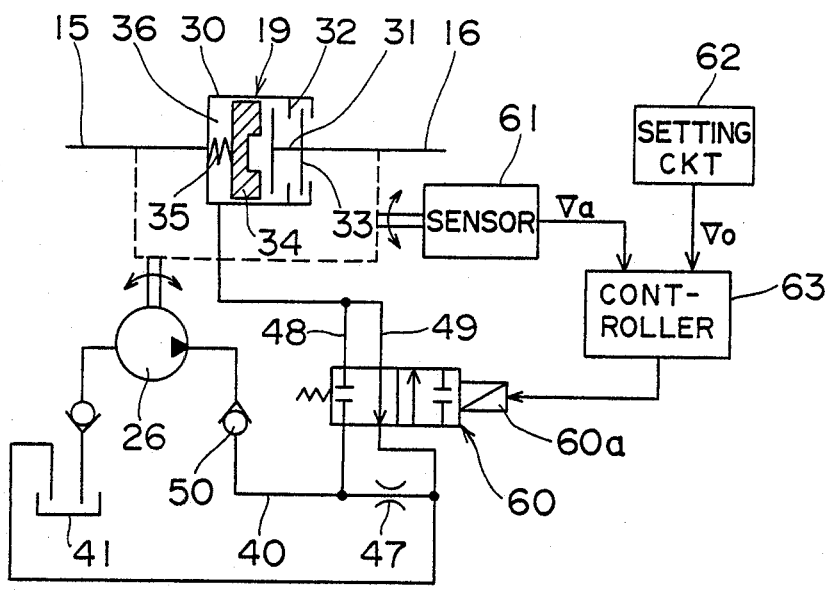
FIG. 8 is a hydraulic circuit diagram of a second specific example of transmission according to the invention, and in which an electrical control system is also shown in block diagram.

Referring next to FIG. 8, there is shown another transmission according to the invention. This transmission uses a selector valve 60 having a solenoid 60a, instead of the selector valve 42 shown in FIG. 4. A sensor 61 is connected with the input shaft 15 and the output shaft 16 to detect the difference between their rotational speeds. The output voltage $V_a$ from the sensor is fed to a controller 63. A setting circuit 62 applies a reference voltage $V_0$ to the controller 63, the voltage $V_0$ corresponding to the speed difference $N_1$, say 30 rpm, at which the braking region M shown in FIG. 2 is exceeded. The controller 63 comprises a comparator and a solenoid driver circuit, for example. When the output voltage $V_a$ from the sensor exceeds the reference voltage $V_0$, the solenoid 60a is energized. When the difference N between the rotational speeds of the shafts 15 and 16 is not in excess of the critical value $N_1$, only the third passage 49 is open to place the oil chamber 36 of the clutch 19 in communication with the tank 41. When the difference N exceeds the critical value $N_1$, the solenoid $60_a$ is energized to switch the selector valve 60 to its other state. As a result, only the second passage 48 is opened to permit the oil delivered by the pump 26 to flow into the oil chamber 36 in the hydraulic clutch 19.

Obviously, numerous modifications and variations of the present invention are possible in light of the above teachings. It is therefore to be understood that within the scope of the appended claims, the present invention may by practiced otherwise than as specifically described herein.

What is claimed is:

1. A transmission for use with a vehicle with four-wheeled drive, said transmission comprising:
   a first drive shaft connected with the front wheels;
   a second drive shaft connected with the rear wheels;
   a hydraulic clutch connected with the first and second drive shafts and having outer plates and inner plates, the inner plates being capable of frictionally engaging with the outer plates to selectively transmit rotating force between the first and second drive shafts;
   a pump connected with the first and second drive shafts and acting to produce a hydraulic pressure corresponding to the difference between the rotational speeds of the drive shafts;
   a first oil passage for guiding the oil delivered by the pump into a reservoir;
   a restrictor formed in the first oil passage;
   a bias spring for pressing the outer and inner plates of the clutch towards each other at all times;
   a second oil passage for guiding the oil delivered by the pump into an oil chamber formed in the clutch;
   a third oil passage which connects the oil chamber in the clutch directly with the reservoir, by passing the restrictor; and
   a selector valve means which, when the difference between speeds of the two drive shafts is small, closes the second oil passage and opens the third oil passage and which, when the difference is large, opens the second passage and closes the third passage.

2. The transmission of claim 1, wherein said selector means comprises:
   a valve means which is connected with the pump, the reservoir, and the second and third oil passages and which assumes either a first position, where it disconnects the second passage from the pump and connects the third passage with the reservoir, or a second position, where it connects the second passage with the pump and disconnects the third passage from the reservoir; and
   a spring which, when the pressure difference ahead and behind the restrictor is small, moves the valve means into the first position and which, when the pressure difference ahead and behind the restrictor is large, permits the valve means to move into the second position.

3. The transmission of claim 2, wherein
   (A) said valve means consists of a spool capable of moving axially;
   (B) the spool is mounted in a first hole formed in the selector valve and provided with a second hole extending axially through it, a part of the first oil passage being formed by the first and second holes;
   (C) said restrictor is formed in the second hole in the spool.

4. The transmission of claim 1, wherein said selector valve means comprises:
   a spool having both end surfaces on which the oil delivered by the pump and the oil returning to the reservoir act, the spool acting to open either the second oil passage or the third oil passage, the spool being capable of moving axially; and
   a spring which, when the difference between the rotational speeds of the two drive shafts is lower than a predetermined value, opens only the third oil passage and which when the difference is in excess of the predetermined value, opens only the second oil passage, the spring cooperating with the spool.

5. The transmission of claim 1, further including:
   a detecting means for detecting the difference between the rotational speeds of the two drive shafts; and
   a valve control circuit for controlling said selector valve means consisting of a solenoid selector valve in such a way that when the output from the detecting means is less than a predetermined value, the valve closes the second oil passage and opens the third oil passage, and that when the output from the detecting means exceeds the predetermined value, the valve opens the second passage and closes the third passage.

* * * * *